(12) United States Patent
Yamaki et al.

(10) Patent No.: US 10,495,964 B2
(45) Date of Patent: Dec. 3, 2019

(54) TRANSPARENT SCREEN AND VIDEO IMAGE PROJECTION SYSTEM COMPRISING SAME

(71) Applicant: JXTG NIPPON OIL & ENERGY CORPORATION, Tokyo (JP)

(72) Inventors: Kousuke Yamaki, Tokyo-to (JP); Akira Matsuo, Tokyo-to (JP); Suzushi Nishimura, Tokyo-to (JP)

(73) Assignee: JXTG NIPPON OIL & ENERGY CORPORATION, Tokyo (JP)

( * ) Notice: Subject to any disclaimer, the term of this patent is extended or adjusted under 35 U.S.C. 154(b) by 20 days.

(21) Appl. No.: 15/736,346

(22) PCT Filed: May 24, 2016

(86) PCT No.: PCT/JP2016/065329
§ 371 (c)(1),
(2) Date: Dec. 14, 2017

(87) PCT Pub. No.: WO2016/203915
PCT Pub. Date: Dec. 22, 2016

(65) Prior Publication Data
US 2018/0180982 A1 Jun. 28, 2018

(30) Foreign Application Priority Data
Jun. 15, 2015 (JP) ................................ 2015-120596

(51) Int. Cl.
*G03B 21/62* (2014.01)
*G02B 5/02* (2006.01)
(Continued)

(52) U.S. Cl.
CPC ................ *G03B 21/62* (2013.01); *E06B 7/28* (2013.01); *G02B 5/02* (2013.01); *G02B 5/0242* (2013.01); *G03B 21/00* (2013.01); *H04N 5/74* (2013.01)

(58) Field of Classification Search
CPC ...................................................... G03B 21/62
See application file for complete search history.

(56) References Cited

U.S. PATENT DOCUMENTS

| 8,372,505 | B2 | 2/2013 | Etori et al. |
| 10,018,754 | B2 * | 7/2018 | Matsuo ..................... B32B 7/02 |

(Continued)

FOREIGN PATENT DOCUMENTS

| JP | 11-194204 | 7/1999 |
| JP | 2001-242546 | 9/2001 |

(Continued)

OTHER PUBLICATIONS

Japanese Notification of Reason for Revocation dated May 30, 2018 in corresponding Japanese patent application No. 2016-562616, with English translation.
(Continued)

*Primary Examiner* — Christopher E Mahoney
(74) *Attorney, Agent, or Firm* — Wenderoth, Lind & Ponack, L.L.P.

(57) ABSTRACT

[Problem] Provided is a transparent screen which satisfies both the visibility of the projection light and the transmission light by anisotropically scattering and reflecting the projection light emitted from a light source.
[Solving means] A transparent screen according to the present invention comprises a light diffusion layer including a binder and microparticles,
said transparent screen having a scattered light brilliance profile characterized to meet the following conditions A to C:

(Continued)

A: the emitted light relative brilliance in the 0° direction is from 50 to 95, when the entered light relative brilliance is 100;
B: the emitted light relative brilliance in the ±5° direction is 1.1 or less, when the emitted light relative brilliance in the 0° direction is 100; and
C: the emitted light relative brilliance in the ±50° direction is 0.0005 or higher, when the emitted light relative brilliance in the 0° direction is 100;

when the brilliance is Y from the XYZ color system measured with a goniophotometer.

14 Claims, 3 Drawing Sheets

(51) Int. Cl.
   *G03B 21/00*   (2006.01)
   *H04N 5/74*    (2006.01)
   *E06B 7/28*    (2006.01)

(56) References Cited

U.S. PATENT DOCUMENTS

| | | | |
|---|---|---|---|
| 2001/0005282 A1 | 6/2001 | Etori et al. | |
| 2003/0174396 A1* | 9/2003 | Murayama | G03B 21/62 359/453 |
| 2009/0316261 A1 | 12/2009 | Garcia-Leiner et al. | |
| 2011/0149389 A1* | 6/2011 | Sharp | B29D 11/0074 359/452 |
| 2011/0317099 A1* | 12/2011 | Fuchida | G02B 5/0242 349/64 |
| 2014/0240825 A1* | 8/2014 | Okumura | G03B 21/62 359/453 |
| 2017/0075207 A1* | 3/2017 | Tao | G02B 5/02 |
| 2018/0348411 A1* | 12/2018 | Yamaki | G02B 5/02 |

FOREIGN PATENT DOCUMENTS

| | | |
|---|---|---|
| JP | 2004-341446 | 12/2004 |
| JP | 2005-99675 | 4/2005 |
| JP | 2006-146019 | 6/2006 |
| JP | 2007-192866 | 8/2007 |
| JP | 2007-240686 | 9/2007 |
| JP | 2007-264113 | 10/2007 |
| JP | 2008-112040 | 5/2008 |
| JP | 2010-518426 | 5/2010 |
| JP | 2010-122559 | 6/2010 |
| JP | 4571691 | 10/2010 |
| JP | 2010-281986 | 12/2010 |
| JP | 2011-113068 | 6/2011 |
| JP | 2013-171246 | 9/2013 |
| JP | 2013-182141 | 9/2013 |
| JP | 2014-153708 | 8/2014 |

OTHER PUBLICATIONS

Japanese Written Opinion dated May 30, 2018 in corresponding Japanese patent application No. 2016-562616.
https://www.tcichemicals.com/ja/jp/support-download/brochure/F2031.pdf (website from TCI Chemicals).
http://www.poval.jp/japan/poval/gradelist/gl_01.html (website from Kuraray).
http://www.poval.jp/japan/poval/gradelist/gl_03.html (website from Kuraray).
Introduction to Color Engineering, Morikita Shuppan K.K., issued 2007, with partial English translation.
English Machine Translation of JP 2014-153708 previously cited in an IDS filed on Dec. 14, 2017.
Japanese Written Opinon dated Dec. 20, 2017 in corresponding Japanese patent application No. 2017-701093, with partial English translation.
Japanese Notification of Reason for Refusal dated Jan. 25, 2018 in corresonding Japanese patent application No. 2017-701093, with English translation.
Sumitomo Chemical Co., Ltd., "Light Diffuser Plates for LCD-TV Backlight Systems", R&D Report "Sumitomo Kagaku", vol. 2007-I, published May 31, 2007.
Opposition Decision dated Nov. 7, 2018 in corresponding Japanese patent application No. 2016-562616 (JP 6133522B1), with English translation.
International Search Report dated Aug. 9, 2016 in International Application No. PCT/JP2016/065329.
Office Action dated Dec. 6, 2016 in Japanese patent application No. 2016-562616, with machine translation.
Office Action dated Mar. 7, 2017 in Japanese patent application No. 2016-562616, with machine translation.
International Preliminary Report on Patentability dated Dec. 28, 2017 in International Application No. PCT/JP2016/065329.
Extended European Search Report dated Jan. 23, 2019 in corresponding European patent application No. 16811390.0.
Anonymous: "Goniometric (spectral) GSP-1B GCMS-3B GSP-2 GCMS-4 Goniometric (photometric) GP-5 GP-200 GP-700 Color CMS-35SP CMS-35FS DOT-3C Gloss and Reflectance GM-26PRO GM-26PRO/Auto GM-3D RM-3D RM-9 GMX-102 GMX-203 Haze and Clarity HM-150 HM-65W HM-150L2 HM-150N HR-100 HSP-150 TM-1D HMS-3 Online Systems Gloss", Dec. 19, 2018, XP055536420, 2 pages.

\* cited by examiner

TRANSPARENT SCREEN AND VIDEO IMAGE PROJECTION SYSTEM COMPRISING SAME

TECHNICAL FIELD

The present invention relates to a transparent screen which satisfies both the visibility of the projection light and the transmission light by anisotropically scattering and reflecting the projection light emitted from a light source. The present invention also relates to a video image projection system comprising the transparent screen and a projection device.

BACKGROUND ART

Conventionally, a combination of a Fresnel lens sheet and a lenticular lens sheet has been used for a projector screen. In recent years, a demand for displaying merchandise information, advertisement, or the like by projection on a show window of a department store or the like, a transparent partition of an event venue, or the like while maintaining the transparency thereof is growing. It is said that, in the future, a demand for a highly transparent projection type image display screen which is used for a head-up display, a wearable display, or the like will be further increasing.

However, since a conventional projector screen has a low transparency, there is a technical problem that such a projector screen cannot be applied to a transparent partition, or the like. Accordingly, as a projector screen, a screen having a recess on its surface is proposed (see Patent Document 1). A transmission type screen comprising a transparent thin film layer including diamond microparticles having a median diameter of 0.01 to 1 μm obtained by subjecting nanodiamond having a graphite phase obtained by an exposure method to an oxidation treatment is proposed (see Patent Document 2). Further, a film for a highly transparent reflection type screen composed of a polymer film composed of a matrix phase and a disperse phase containing a thermoplastic resin is proposed (see Patent Document 3).

In order to prevent a reflection on the surface of a variety of screens such as a transmission type screen or a reflection type screen, it is proposed that an antiglare member having an antiglare layer composed of black microparticles and a transparent binder is disposed on the surface of such screens (see Patent Document 4). Further, in order to prevent a decrease in the contrast, it is proposed to provide a transmission type screen on which a condenser is provided (Patent Document 5). Still further, it is proposed to provide a reflection type screen comprising a substrate, an optical absorbing layer, an optical multilayer film, and an optical diffusion layer in the order mentioned (see Patent Document 6).

RELATED ART DOCUMENTS

Patent Documents

Patent Document 1 Japanese Unexamined Patent Application Publication No. 2006-146019
Patent Document 2 Japanese Unexamined Patent Application Publication No. 2011-113068
Patent Document 3 Japanese Unexamined Patent Application Publication No. 2008-112040
Patent Document 4 U.S. Pat. No. 4,571,691
Patent Document 5 Japanese Unexamined Patent Application Publication No. 2007-240686
Patent Document 6 Japanese Unexamined Patent Application Publication No. 2005-99675

SUMMARY OF THE INVENTION

Problems to be Solved by the Invention

However, the present inventors found the following technical problems in Patent Documents 1 to 6. When a screen described in Patent Document 1 is applied to a transparent partition or the like of a show window or an event venue, there is a technical problem that the screen cannot maintain the performance for a long period of time since the concavoconvex portion wears with its usage. There is also a technical problem that a film clouds and the transparency is compromised since the diameter of optical diffusion particles is 1 to 20 μm. Nanodiamond particles used for a transparent screen described in Patent Document 2 have a technical problem that many treatment processes are required, resulting in reduced production efficiency or deteriorated production cost. A screen described in Patent Document 3 is obtained by stretching in at least one direction in order to exhibit the anisotropy of refraction. However, the stretching for exhibiting the anisotropy of refraction has a technical problem that the property in a direction perpendicular to a drawing direction may be nonuniform, and a further improvement is desired. A screen described in Patent Document 4 has a technical problem that the transparency is poor and the screen is grayish due to an influence of a carbon black since the screen comprises an antiglare member including black microparticles such as a carbon black having an average particle size of 1 to 6 μm.

There is a technical problem that the transparency is significantly compromised since a transmission type screen described in Patent Document 5 comprises a condenser. A reflection type screen described in Patent Document 6 comprises an optical multilayer film formed by layering a low refractive index layer made of a fluorine resin and a high refractive index layer containing a metal oxide, and there is a technical problem that light reflects on the interface of these layers, which compromises the transparency.

Means for Solving the Problems

The present invention has been made in view of the above-described technical problems, and an object of the present invention is to provide a film for a transparent screen which satisfies both the visibility of the projection light and the transmission light by anisotropically scattering and reflecting the projection light emitted from a light source. An object of the present invention is also to provide a video image projection system comprising the transparent screen.

In order to solve the above described technical problems, the present inventors intensively studied to find that the above described technical problems can be solved when the scattered light brilliance profile of the transparent screen satisfies a specific condition. The present invention has been completed based on such findings.

That is, according to one aspect of the present invention, provided is a transparent screen comprising a light diffusion layer including a binder and microparticles,
said transparent screen having a scattered light brilliance profile characterized to meet the following conditions A to C:
A: the emitted light relative brilliance in the 0° direction is from 50 to 95 or less, when the entered light brilliance is 100;

B: the emitted light relative brilliance in the ±5° direction is 1.1 or less, when the emitted light relative brilliance in the 0° direction is 100; and C: the emitted light relative brilliance in the ±50° direction is 0.0005 or higher, when the emitted light relative brilliance in the 0° direction is 100;

when the brilliance is Y from the XYZ color system measured with a goniophotometer.

According to one aspect of the present invention, preferably, when the thickness of the light diffusion layer is t (μm) and the concentration of the microparticles based on the binder is c (% by mass), t and c satisfy the following formula (I):

$$0.05 \leq (t \times c) \leq 50 \tag{I}.$$

According to one aspect of the present invention, preferably, the microparticles are light scattering microparticles or light reflecting microparticles.

According to one aspect of the present invention, preferably, the primary particles of the light scattering microparticles have a median diameter of from 0.1 to 2500 nm.

According to one aspect of the present invention, preferably, the absolute value of the difference between refractive index $n_1$ of the binder and refractive index $n_2$ of the light scattering microparticles is 0.1 or higher.

According to one aspect of the present invention, preferably, the light scattering microparticles are at least one selected from the group consisting of zirconium oxide, zinc oxide, titanium oxide, cerium oxide, barium titanate, strontium titanate, a cross-linked acrylic resin, a styrene resin, and silica.

According to one aspect of the present invention, preferably, the light reflecting microparticles are bright flake-form microparticles, and have an average aspect ratio from 3 to 800 and a regular reflectance from 12 to 100%.

According to one aspect of the present invention, preferably, the bright flake-form microparticles are metallic particles selected from the group consisting of aluminum, silver, platinum, gold, titanium, nickel, tin, tin-cobalt alloy, indium, chromium, titanium oxide, aluminum oxide, and zinc sulfide, a bright material of a glass coated with metallic oxide or metal, or a bright material of natural or synthetic mica coated with metal or metallic oxide.

According to one aspect of the present invention, preferably, the binder is an organic binder or an inorganic binder.

According to one aspect of the present invention, preferably, the organic binder is a thermoplastic resin or a self-crosslinkable resin.

According to one aspect of the present invention, preferably, the thermoplastic resin is at least one selected from the group consisting of an acrylic resin, a polyester resin, a polyolefin resin, a vinyl resin, a polycarbonate resin, and a polystyrene resin.

In another aspect of the present invention, provided is a member for a vehicle comprising the transparent screen described above.

In another aspect of the present invention, provided is a member for a building comprising the transparent screen described above.

In another aspect of the present invention, provided is a video image projection system comprising the transparent screen described above and a projection device which projects an image from the degree of ±10° or higher to the normal direction of the screen surface of the transparent screen.

Effects of the Invention

According to the present invention, a transparent screen can be provided which satisfies both the visibility of the projection light and the transmission light by anisotropically scattering and reflecting the projection light emitted from a light source. Such a transparent screen can be suitably used as a transparent screen particularly for a short focus type projector.

MODE FOR CARRYING OUT THE INVENTION

<Transparent Screen>

A transparent screen according to the present invention comprises light diffusion layer including a resin and microparticles. The transparent screen may be of a monolayer configuration composed of only the light diffusion layer, or may be a layered body configuration having a plurality of layers further comprising other layers such as a protection layer, a backing layer, an adhesive layer, and a reflection protection layer. The transparent screen may comprise a support such as a glass, a transparent partition, or the like. The transparent screen can satisfy both the visibility of the projection light and the transmission light by anisotropically scattering and reflecting the projection light emitted from a light source. The transparent screen can be suitably used for a glass window, a head-up display, a wearable display, or the like and particularly, it is used as a transparent screen for a short focus type projector. In addition, the transparent film according to the present invention can be suitably used for a member for a vehicle or a member for a building. In the present invention, the term "transparent" includes "translucent" which can attain a transmission visibility depending on applications.

The transparent screen has a scattered light brilliance profile satisfying the following conditions A to C:

A: the emitted light relative brilliance in the 0° direction is from 50 to 95, preferably from 55 to 90, more preferably from 60 to 85, when the entered light brilliance is 100;

B: the emitted light relative brilliance in the ±5° direction is 1.1 or less, preferably from 0.04 to 1.0, more preferably from 0.06 to 0.9, still more preferably from 0.075 to 0.5, when the emitted light relative brilliance in the 0° direction is 100; and C: the emitted light relative brilliance in the ±50° direction is 0.0005 or higher, more preferably from 0.0007 to 0.20, more preferably from 0.0009 to 0.1, still more preferably from 0.001 to 0.05, when the emitted light relative brilliance in the 0° direction is 100;

when the brilliance is Y from the XYZ color system measured with a goniophotometer. The transparency of the screen becomes high by satisfying condition A. The turbidity will be extremely reduced by satisfying condition B. Since human eyes recognizes the turbidity even if the transmission light is diffused at an angle low in several degrees, the scattered light brilliance at a low angle is better to be small. Meanwhile, since the light source of the projector is glaring, it is common not to arrange the projector such like the projection image is seen from such low angle direction, and also in view of clearly projecting the projection image, the scattered light brilliance at a low angle is unnecessary. The projection image of the projector can be clearly projected on the screen by satisfying condition C. In order to clearly display the projection image, a scattered light brilliance at a wide angle is necessary. That is to say, by satisfying all conditions from A to C, visibility of the transmission light becomes excellent due to a high transparency of the screen and a clear video image can be displayed on the screen. In addition, a video image projection system can be provided in which the background of the screen and the projection image are visible simultaneously by arranging a projection device projecting the image from an angle of ±10° with respect to the normal direction of the screen surface.

The transparent screen may be a rear projection screen (transmission type screen) or may be a front projection screen (reflection type screen). That is, in a video image display device comprising a transparent screen according to the present invention, a projection device (a light source) may be positioned on the observer side with respect to the screen or may be positioned on the opposite side of the observer. The transparent screen may have a plane surface or a curved surface.

The haze value of the transparent screen is preferably 50% or less, more preferably from 1% to 40%, more preferably from 1.3% to 30%, still more preferably from 1.5% to 20%. The total light transmittance is preferably 70% or higher, more preferably 75% or higher, further preferably 80% or higher, and still more preferably 85% or higher. Further, the diffusion transmittance of the transparent screen is preferably from 1.5% to 60%, more preferably from 1.7% to 55%, more preferably from 1.9% to 50%, still more preferably from 2.0% to 45%. When the haze value and the total light transmittance is in the above-described ranges, the transmission visibility can be further improved and when the diffusion transmittance is in the above-described ranges, the entered light can be diffused efficiently and the viewing angle can be more improved. Therefore, the screen performance becomes excellent. In the present invention, the haze value, the total light transmittance, and the diffusion transmittance of a transparent screen can be measured by using a haze meter (manufactured by NIPPON DENSHOKU INDUSTRIES CO., LTD., trade name: NDH-5000) in accordance with JIS-K-7361 and JIS-K-7136.

The image clarity of the transparent screen is preferably 70% or higher, more preferably 75% or higher, further preferably 80% or higher, still more preferably 85% or higher, and particularly preferably 90% or higher. When the image clarity of the transparent screen is in the above-described range, an image appeared through such a transparent screen is considerably clear. In the present invention, the image clarity is a value of definition (%) when measured with an optical comb having a width of 0.125 mm in accordance with JIS K7374.

Figure 1:
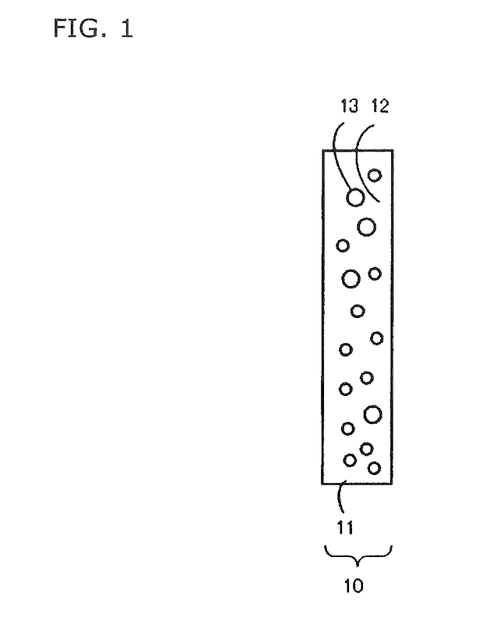
FIG. 1 is a cross-sectional view in the thickness direction of one embodiment of a transparent screen according to the present invention.
Figure 2:
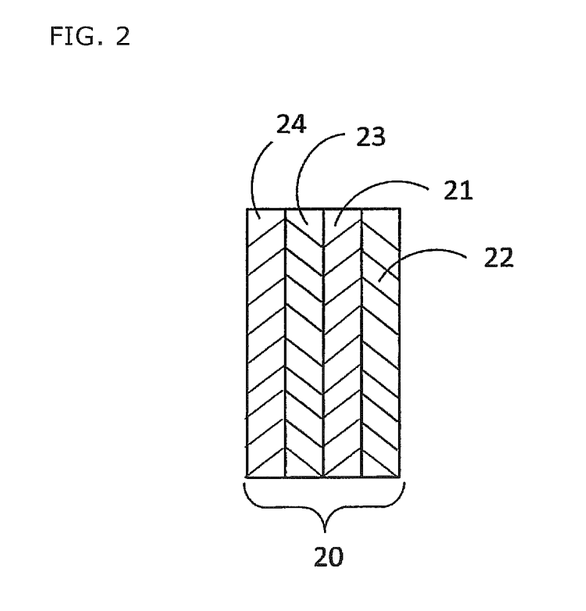
FIG. 2 is a cross-sectional view in the thickness direction of one embodiment of a transparent screen according to the present invention.

FIG. 1 is a cross-sectional view in the thickness direction of one embodiment of the transparent screen according to the present invention. A transparent screen 10 comprises a light diffusion layer comprising a binder 12 and microparticles 13 dispersed in the binder 12. FIG. 2 is a cross-sectional view in the thickness direction of one embodiment of the transparent screen in a plural layered configuration. A transparent screen 20 is made by a light diffusion layer 21 layered on one surface of a backing layer 23 and additionally a protection layer 22 layered on the light diffusion layer 21. Further, an adhesive layer 24 is layered on the other surface of the backing layer (the surface opposite to the light diffusion layer 21). In the following, configuration of the transparent screen will be described in details.

(Light Diffusion Layer)

A light diffusion layer comprises a binder and microparticles. The below-described light scattering microparticles or bright flake-form microparticles may be suitably used for the microparticles. By using such microparticles, light will be anisotropically scattered and reflected in the light diffusion layer and use efficiency of light can be enhanced.

When the thickness of the light diffusion layer is t (μm) and the concentration of the microparticles based on the binder is c (% by mass), t and c preferably satisfy the following formula (I):

$$0.05 \leq (t \times c) \leq 50 \qquad (I),$$

more preferably the following formula (I-2):

$$0.1 \leq (t \times c) \leq 40 \qquad (I-2),$$

further preferably the following formula (I-3):

$$0.15 \leq (t \times c) \leq 35 \qquad (I-3),$$

still more preferably the following formula (I-4):

$$0.3 \leq (t \times c) \leq 30 \qquad (I-4).$$

When the thickness t of the light diffusion layer and the concentration c satisfy the above-described formula (I), the state of the microparticles dispersed in the binder of the light diffusion layer of the screen is not dense (the concentration of the microparticles in the binder is low), the proportion of light transmitted in a straightforward manner is increased (the proportion of light which does not hit the microparticles is increased), therefore, as a result, a clear video image can be displayed on the screen without compromising the visibility of the transmission light.

The thickness of the light diffusion layer is not particularly limited but in view of applications, productivity, handling, and transport, it is preferably from 0.1 μm to 20 mm, more preferably from 0.2 μm to 15 mm, further preferably from 1 μm to 10 mm. When the thickness of the light diffusion layer is in the above range, the intensity of the screen is easier to be maintained. The light diffusion layer may be a resin molded body or may be a coated film formed on a substrate consisting of a glass, a resin, or the like. The light diffusion layer may be a monolayer configuration or may be a configuration having a plurality of layers where 2 or more layers are layered by coating, or the like, or where 2 or more light diffusion layers are adhered together by adhesives, or the like.

For the light diffusion layer, highly transparent organic or inorganic binders are preferably used in order to obtain a highly transparent film. For a highly transparent organic binder, a resin, for example, a self crosslinkable resin such as a thermoplastic resin, a thermoset resin, an ionizing radiation-curable resin, and the like can be used. Examples of the highly transparent resin include an acrylic resin, an acrylic urethane resin, a polyester acrylate resin, a polyurethane acrylate resin, an epoxy acrylate resin, a polyester resin, a polyolefin resin, a urethane resin, an epoxy resin, a polycarbonate resin, a cellulose resin, an acetal resin, a vinyl resin, a polystyrene resin, a polyamide resin, a polyimide resin, a melamine resin, a phenol resin, a silicone resin, and a fluorocarbon resin.

For the highly transparent thermoplastic resins, preferably, an acrylic resin, a polyester resin, a polyolefin resin, a cellulose resin, a vinyl resin, a polycarbonate resin, and a polystyrene resin are used, and more preferably, a polymethyl methacrylate resin, a polyethylene terephthalate resin, a polyethylene naphthalate resin, a polypropylene resin, a cycloolefin polymer resin, a cellulose acetate propionate resin, a polyvinyl butyral resin, a nitrocellulosic resin, a polycarbonate resin, and a polystyrene resin are used. These resins may be used singly, or in combination of two or more kinds thereof.

Examples of the highly transparent ionizing radiation-curable resin include an acrylic resin, a urethane resin, an acrylic urethane resin, an epoxy resin, silicone resin, and the like. Among these, those having an acrylate functional group, for example, those containing a relatively large amount of a monofunctional monomer such as ethyl (meth) acrylate, ethylhexyl (meth)acrylate, styrene, methyl styrene, N-vinylpyrrolidone and a polyfunctional monomer, such as polymethylolpropane tri(meth)acrylate, hexane diol (meth) acrylate, tripropylene glycol di(meth)acrylate, diethylene glycol di(meth)acrylate, pentaerythritol tri(meth)acrylate, dipentaerythritol hexa(meth)acrylate, 1,6-hexane diol di(meth)acrylate, neopentyl glycol di(meth)acrylate as an oligomer or a prepolymer of a polyester resin, a polyether resin, an acrylic resin, an epoxy resin, a urethane resin, an alkyd resin, a spiroacetal resin, a polybutadiene resin, a polythiol polyene resin, a (meth)acrylate of a polyfunctional compound such as a polyalcohol and a reactivity diluent having a relatively low molecular weight are preferable. The ionizing radiation-curable resin may be obtained by mixing a thermoplastic resin and a solvent. A commercially available ionizing radiation-curable resin can be used, and for example, urethane acrylate type UV curable resin manufactured by DIC Company (Product Name: UNIDIC V-4018) can be used.

Examples of the highly transparent thermoset resin include a phenol resin, an epoxy resin, a silicone resin, a melamine resin, a urethane resin, a urea resin, and the like. Among these, an epoxy resin and a silicone resin are preferable.

Examples of the highly transparent inorganic binder include a liquid glass, a glass material having a low softening point, or a sol-gel material. A liquid glass is a solution rich in alkali silicate and as an alkali metal, normally sodium is contained. A representative liquid glass can be expressed by $Na_2O \cdot nSiO_2$ (n: a given number of a positive value) and sodium silicate manufactured by Fuji Kagaku Corp. can be used from the commercially available products.

The glass material having a low softening point is a glass having a softening temperature preferably in the range from 150 to 620° C., more preferably from 200 to 600° C., most preferably from 250 to 550° C. Such glass materials include a lead-free low softening point glass, or the like, obtainable by thermal treatment of a mixture comprising $PbO-B_2O_3$ based, $PbO-B_2O_3-SiO_2$ based, $PbO-ZnO-B_2O_3$ based acid component and metallic chloride. In order to improve the dispersibility and formability of the microparticles, solvents and organic solvents having high boiling point can be mixed to the low softening point glass material.

Sol-gel materials are a group of compounds which hydrolytic polycondensation proceeds and the material cures by action of heat, light, catalysts, or the like. For example, they may be metal alkoxide (metal alcoholate), a metal chelate compound, halogenated metal, a liquid glass, a spin-on glass, or reactants thereof and catalysts may be included therein to accelerate curing. Or, those having photoreactive functional groups such as an acrylic group in a moiety of a metal alkoxide functional group may be possible. These may be used alone or by combining multiple kinds, depending on the required physicality. A curing body of the sol-gel materials refers to a state where the polymerization reaction of the sol-gel materials has been sufficiently progressed. The sol-gel material chemically bond and strongly adhere to the surface of an inorganic substrate in the couse of polymerization reaction. Accordingly, by using a curing body of the sol-gel material as the curing material layer, a stable curing material layer can be formed.

Metal alkoxide is a group of compounds obtainable from a reaction of any metallic species with water or organic solvents by hydrolysis catalysts, and is a group of compounds which any metallic species and functional groups such as a hydroxyl group, a methoxy group, an ethoxy group, a propyl group, an isopropyl group, or the like, are bonded. Metallic species of metal alkoxide include silicon, titanium, aluminum, germanium, boron, zirconium, tungsten, sodium, potassium, lithium, magnesium, tin, or the like.

Metal alkoxide in which the metallic species is silicon includes, for example, dimethyldiethoxysilane, diphenyldiethoxysilane, phenyltriethoxysilane, methyltriethoxysilane (MTES), vinyltriethoxysilane, p-styryltriethoxysilane, methylphenyldiethoxysilane, 2-(3,4-epoxycyclohexyl)ethyltriethoxysilane, 3-glycidoxypropyltriethoxysilane, 3-glycidoxypropylmethyldiethoxysilane, 3-methacryloxypropylmethyldiethoxysilane, 3-methacryloxypropyltriethoxysilane, 3-acryloxypropyltriethoxysilane, N-2-(aminoethyl)-3-aminopropylmethyldiethoxysilane, N-2-(aminoethyl)-3-aminopropyltriethoxysilane, 3-aminopropyltriethoxysilane, 3-ureidopropyltriethoxysilane, 3-mercaptopropylmethyldiethoxysilane, 3-mercaptopropyltriethoxysilane, triethoxysilane, diphenylsilanediol, dimethylsilanediol, or a group of compounds where the ethoxy groups of these group of compounds are substituted with a methoxy group, a propyl group, an isopropyl group, a hydroxyl group, or the like. Amongst these, triethoxy silane (TEOS) and tetramethoxysilane (TMOS) in which the ethoxy group of TEOS is substituted with a methoxy group are especially preferable. These may be used alone or by combining multiple kinds.

(Solvent)

Such organic and inorganic binders may further contain a solvent if necessary. The solvent is not limited to organic solvents and solvents used in general coating compositions can be employed. For example, a hydrophilic solvate, represented by water, can be used. When the binder of the present invention is a liquid, solvents does not have to be contained.

Specific examples of the solvent according to the present invention include, for example, alcohols such as methanol, ethonaol, isopropyl alcohol (IPA), n-propanol, butanol, 2-butanol, ethylene glycol, and propylene glycol; aliphatic carbon hydrides such as hexane, heptane, octane, decane, and cyclohexane; aromatic carbon hydrides such as benzene, toluene, xylene, mesitylene, and tetramethylbenzene; ethers such as diethylether, tetrahydrofuran, and dioxane; ketones such as acetone, methyl ethyl ketone, isophorone, cyclohexanone, cyclopentanone, and N-methyl-2-pyrrolidone; ether alcohols such as butoxyethyl ether, hexyloxy ethyl alcohol, methoxy-2-propanol, and benzyloxy ethanol; glycols such as ethylene glycol and propylene glycol; glycol ethers such as ethylene glycol dimethylether, diethylene glycol dimethyl ether, propylene glycol monomethyl ether acetate, cellosolve, methyl cellosolve, ethyl cellosolve, carbitol, methyl carbitol, ethyl carbitol, butyl carbitol, propylene glycol monomethyl ether, propylene glycol monoethyl ether, dipropylene glycol monomethyl ether, dipropylene glycol monoethyl ether, triethylene glycol monomethyl ether, and triethylene glycol monoethyl ether; esters such as ethyl acetate, butyl acetate, ethyl lactate, and γ-butylolactone; phenols such as chlorophenol; amides such as N,N-dimethyl formamide, N,N-dimethyl acetamide, and N-methylpyrrolidone; halogenated solvates such as chloroform, methylene chloride, tetrachloroethane, monochlorobenzene, and dichlorobenzene; hetero element containing compounds such as carbon bisulfide; water; and mixed solvates thereof. The amount of solvates to be added can be appropriately adjusted, depending on the kind of binders or microparticles, or the viscosity range suitable for the manufacturing steps to be discussed below.

(Light Scattering Microparticles)

As for the light scattering microparticles, substantially spherical microparticles can be used and completely spherical particles and spherical particles having concavity and convexity or protrusions may be contained. The absolute value of the difference between the refractive index $n_1$ of the binder and the refractive index $n_2$ of the light scattering microparticles is preferably 0.1 or higher, more preferably 0.15 or higher, further preferably 0.2 or higher. When the absolute value of the difference between the refractive indice of the binder, which is forming the light diffusion layer, and the light scattering microparticles is 0.1 or higher, the scattered light intensity can be improved and even when the state of the microparticles dispersed in the binder is not dense (even when the concentration of the microparticles in the binder is low), the wide angle scattered light brilliance can be increased. Therefore, light is anisotropically scattered in the light scattering layer which makes it possible to improve the viewing angle and use efficacy of light.

As for the light scattering microparticles having a high refractive index, metal oxides or metallic particles by atomizing metal salts can be used which have a refractive index $n_2$ of preferably from 1.80 to 3.55, more preferably from 1.9 to 3.3, further preferably from 2.0 to 3.0. The metal oxides include, for example, zirconium oxide (n=2.40), zinc oxide (n=2.40), titanium oxide (n=2.72), cerium oxide (n=2.20), or the like. Metal salts include, for example, barium titanate (n=2.40) and strontium titanate (n=2.37). The inorganic light scattering microparticles having a low refractive index include, for example, particles by atomizing silica (silicon oxide, n=1.45), or the like, which have a refractive index $n_2$ of preferably from 1.35 to 1.80, more preferably from 1.4 to 1.75, further preferably from 1.45 to 1.7. Further, examples of organic light scattering microparticles having a low refractive index include acrylic resin based particles and polystyrene resin based particles. These light scattering microparticles can be used alone or by combining 2 or more kinds.

The median diameter for the primary particles of the light scattering microparticles are preferably from 0.1 to 2500 nm, more preferably from 0.2 to 1500 nm, further preferably from 0.5 to 500 nm. When the median diameter for the primary particles of the light scattering microparticles is in the above range, a sufficient diffusion effect of the projection light can be obtained without compromising the transmission visibility, and thus, a clear video image can be projected on the transparent screen. In the present invention, the median diameter ($D_{50}$) for the primary particles of the light scattering microparticles can be determined from a particle size distribution measured using a particle size distribution measurement apparatus (manufactured by Otsuka Electronics Co., Ltd., product name: DLS-8000) by a dynamic light scattering method.

The content of the light scattering microparticles can be appropriately adjusted depending on the thickness of the light diffusion layer or the refractive index of the light scattering microparticles. The content of the light scattering microparticles in the light diffusion layer is preferably from 0.0001 to 2.0% by mass, more preferably from 0.001 to 1.0% by mass, further preferably from 0.005 to 0.5% by mass, still more preferably from 0.01 to 0.3% by mass, based on the binder. When the content of the light scattering microparticles in the light diffusion layer is in the above range, both the visibility of the diffusion light and the transmission light can be satisfied by diffusing the projection light sufficiently and anisotropically emitted from the projection device, while maintaining the transparency of the light diffusion layer.

(Bright Flake-Form Microparticles)

As for the bright flake-form microparticles, a bright material processable to a flake-form can be suitably used. The regular reflectance of the bright flake-form microparticles is preferably 7 12.0% or higher, more preferably 15.0% or higher, further preferably from 20.0% to 80.0%. In the present invention, the regular reflectance of the bright flake-form microparticles is measured in such way as follows.

(Regular Reflectance)

The regular reflectance is measured by using a spectrophotometer (Part No.: CM-3500d; manufactured by KONICA MINOLTA INC.). The bright flake-form microparticles dispersed in an appropriate solvent (water or methyl ethyl ketone) is coated on a glass slide such that the film thickness will be 0.5 mm or more and dried. The regular reflectance was measured for this obtained glass plate with the coated film when light entered from the glass surface to the coated film at an angle of 45 degrees with respect to the normal line of the glass surface. By measuring the regular reflectance of the case where the bright flake-form microparticles are used as the coated film, the reflective performance of the bright flake-form microparticles can be figured out, taking into consideration of the oxidized state of the surface of the microparticles, or the like.

As for the bright flake-form microparticles, for example, metallic microparticles such as aluminum, silver, platinum, gold, copper, titanium, nickel, tin, tin-cobalt alloy, indium, and chromium, or metallic microparticles consisting of titanium oxide, aluminum oxide, and zinc sulfide, a bright material of a glass coated with metal or metal oxide, or a bright material of natural or synthetic mica coated with metal or metal oxide can be used, depending on the kind of binder to be dispersed in. Commercially available bright flake-form microparticles can be used, and for example, aluminum powder manufactured by Daiwa Kinzoku Kogyo Co., Ltd. can be suitably used.

Metals having excellent reflectiveness of the projection light are used for metal materials of the metallic microparticles. In particular, the metal materials have a reflectance R in measured wavelength of 550 nm of preferably 50% or higher, more preferably 55% or higher, further preferably 60% or higher, still more preferably 70% or higher. In the following, the "reflectance R" in the present invention refers to a reflectance when light entered from the vertical direction with respect to the metallic material. The reflectance R can be calculated from the following formula (1), using values of the refractive index n and extinction value k which are characteristic values of the metal material. n and k are described in, for example, Handbook of Optical Constants of Solids: Volume 1 (authored by Edward D. Palik) and P. B. Johnson and R. W Christy, PHYSICAL REVIEW B, Vol. 6, No. 12, 4370-4379 (1972).

$$R\{(1-n)^2+k^2\}/\{(1+n)^2+k^2\} \quad \text{formula (1)}$$

That is to say, the reflectance R (550) in measured wavelength of 550 nm can be calculated from n and k measured at wavelength of 550 nm. The metal material has an absolute value of difference between the reflectance R (450) in measured wavelength of 450 nm and the reflectance R (650) in wavelength of 650 nm within 25%, preferably within 20%, more preferably within 15%, further preferably within 10% based on the reflectance R (550) in measured wavelength 550 nm. When a reflection type transparent screen is used by using such metal material, the reflectiveness and color reproducibility of the projection light and thus the screen performance become excellent.

The metal material used for the metallic microparticles have a real number term ε' of the electric permittivity preferably from −60 to 0 and more preferably from −50 to −10. The real number term ε' of the electric permittivity can be calculated from the following formula (2) using values of the refractive index n and the extinction index k.

$$\varepsilon'=n^2-k^2 \quad \text{formula (2)}$$

The present invention is not restricted by any theory. However, the real number term ε' of the electric permittivity for the metal material, satisfying the above numerical range, will generate the following action and it is considered that the transparent light scattering body can be used suitably as a reflection type transparent screen. That is to say, when light enters into the metallic microparticles, an oscillating electric field is generated by light in the metallic microparticles; however, at the same time, a reversed electrical polarization is generated by free electrons, blocking the electric field. When presuming an ideal state that when the real number term ε' of electric permittivity is 0 or less, light is completely blocked and light cannot enter into the metallic microparticles, i.e., there are no dispersion by a concavoconvex surface and no light absorbance by metallic microparticles, it will mean that light is reflected totally at the surface of the metallic microparticles, and therefore, the reflectiveness of light will be strong. When ε' is 0 or higher, oscillation of the free electrons of the metallic microparticles cannot follow oscillation of light, thus, the oscillating electric field by light cannot be completely denied and light will enter into or transmit through the metallic microparticles. As a result, only a portion of light is reflected at the surface of the metallicaparticles and the reflectiveness of light will be low. In addition, since oxides, and the like, have less free electrons which can contribute to oscillation, the reflectiveness of light is low.

As the metal material, those using a metal material satisfying the above-described reflectance R and preferably, in addition, the electric permittivity may be used, and also pure metal and alloy can be used. The pure metal is preferably selected from the group consisting of aluminum, silver, platinum, titanium, nickel, and chromium. As for the metallic microparticles, microparticles consisting of those metal materials and microparticles made by coating those metal materials to a resin, a glass, natural or synthetic mica, or the like, can be used. The shape of the metallic microparticles is not particularly limited and bright flake-form microparticles or substantially spherical microparticles can be used. The values of the refractive index n and the extinction index k in each measured wavelength are sorted out in Table 1 and the reflectiveness R and ε' calculated from such values are sorted out in Table 2, with respect to various kinds of the metal materials.

TABLE 1

| Metal | Refractive index n | | | Extinction index k | | |
|---|---|---|---|---|---|---|
| material | n(450) | n(550) | n(650) | k(450) | k(550) | k(650) |
| Aluminum | 0.62 | 0.96 | 1.49 | 5.48 | 6.70 | 7.82 |
| Silver | 0.15 | 0.12 | 0.14 | 2.48 | 3.35 | 4.15 |
| Platinum | 1.85 | 2.13 | 2.38 | 3.15 | 3.72 | 4.25 |
| Titanium | 1.70 | 1.89 | 2.22 | 2.27 | 2.62 | 2.99 |
| Nickel | 1.64 | 1.77 | 2.02 | 2.66 | 3.26 | 3.82 |
| Chromium | 2.34 | 3.17 | 3.10 | 3.14 | 3.33 | 3.33 |
| Copper | 1.17 | 0.95 | 0.21 | 2.40 | 2.58 | 3.67 |
| Gold | 1.50 | 0.35 | 0.17 | 1.88 | 2.73 | 3.15 |

TABLE 2

| Metal | Reflectiveness R | | | \|R(450) − R(650)\|/ R(550) × 100 | the real number term ε' of the electric permittivity | | |
|---|---|---|---|---|---|---|---|
| material | R(450) | R(550) | R(650) | [%] | ε'(450) | ε'(550) | ε'(650) |
| Aluminum | 0.92 | 0.92 | 0.91 | 1.1 | −29.65 | −43.96 | −58.93 |
| Silver | 0.92 | 0.96 | 0.97 | 5.2 | −6.12 | −11.19 | −17.20 |
| Platinum | 0.59 | 0.64 | 0.68 | 14.1 | −6.54 | −9.31 | −12.41 |
| Titanium | 0.45 | 0.50 | 0.54 | 18.0 | −2.28 | −3.27 | −4.01 |
| Nickel | 0.53 | 0.61 | 0.66 | 21.3 | −4.40 | −7.47 | −10.51 |
| Chromium | 0.55 | 0.55 | 0.56 | 1.8 | −4.41 | −1.04 | −1.48 |
| Copper | 0.55 | 0.64 | 0.94 | 60.9 | −4.39 | −5.74 | −13.42 |
| Gold | 0.39 | 0.85 | 0.94 | 64.7 | −1.26 | −7.34 | −9.89 |

The primary particles of the bright flake-form microparticles have an average diameter of preferably from 0.01 to 100 μm, more preferably from 0.05 to 80 μm, further preferably from 0.1 to 50 μm, still more preferably from 0.5 to 30 μm. In addition, the average aspect ratio (=the average diameter/the average thickness of the bright flake-form microparticles) of the bright flake-form microparticles is preferably from 3 to 800, more preferably from 4 to 700, further preferably from 5 to 600, still more preferably from 10 to 500. When the average diameter and the average aspect ratio of the bright flake-form microparticles are within the above range, a sufficient scattering effect of the projection light can be obtained without compromising the transmission visibility and thus, a clear video image can be projected on the transparent screen. In the present invention, the average diameter of the bright flake-form microparticles is measured using a laser diffraction particle size distribution measurement apparatus (Part No.: SALD-2300; manufactured by Shimadzu Corporation). The average aspect ratio was calculated from an SEM (Trade Name: SU-1500; manufactured by Hitachi High Technologies Corporation) image.

The content of the bright flake-form microparticles in the light diffusion layer can be appropriately adjusted, depending on the regular reflectance of the bright flake-form microparticles and is preferably from 0.0001 to 5.0% by mass, preferably from 0.0005 to 3.0% by mass, more preferably from 0.001 to 2.0% by mass, based on the binder. The light diffusion layer formed by dispersing the bright flake-form microparticles in the binder at a low concentration as described above will improve the visibility of the projection light and the transmission light by diffusing the projection light sufficiently and anisotropically, emitted from the projection device.

To the light diffusion layer, conventionally known additives may be added in addition to the microparticles depending on applications. Examples of the additives include an antioxidant, an ultraviolet absorber, a light stabilizer, an antistatic agent, a release agent, a flame retardant, a plasticizer, a lubricant, and a color material. As the color material, a pigment or dye such as carbon black, azo pigment, anthraquinone pigment, or perinone pigment can be used. A liquid crystalline compound or the like may be mixed thereto.

(Backing Layer)

A backing layer is a layer for supporting the light diffusion layer described above, which can improve the strength of a transparent screen. A backing layer is preferably formed by using a highly transparent material such as a glass or a binder, which does not compromise the transmission visibility or the desired optical property of the transparent screen. For such a binder, a highly transparent binder similar to the light diffusion layer described above can be used. A composite film or sheet formed by layering two or more binders described above may be used. The thickness of the backing layer can be appropriately changed depending on the type of the material so that the strength thereof is suitable, and the thickness may be, for example, in the range of from 10 to 1000 μm.

(Protection Layer)

A protection layer is layered on the front side (observer side) of a transparent screen, and is a layer for imparting a function such as a light resistance, a scratch resistance, and a stain resistance. The protection layer is preferably formed by using a resin which does not compromise the transmission visibility or the desired optical property of a transparent screen. For such a resin, for example, a resin cured by an ultraviolet light or electron ray, i.e., an ionizing radiation-curable resin, a mixture obtained by adding a thermoplastic resin and a solvent to an radiation curable resin, and a heat setting resin. Among these, an ionizing radiation-curable resin is particularly preferable.

For a film forming component of the ionizing radiation-curable resin composition, preferably, those having an acrylate functional group, for example, those containing a relatively large amount of a monofunctional monomer such as ethyl (meth)acrylate, ethylhexyl (meth)acrylate, styrene, methyl styrene, N-vinylpyrrolidone and a polyfunctional monomer, such as polymethylolpropane tri(meth)acrylate, hexane diol (meth)acrylate, tripropylene glycol di(meth) acrylate, diethylene glycol di(meth)acrylate, pentaerythritol tri(meth)acrylate, dipentaerythritol hexa(meth)acrylate, 1,6-hexane diol di(meth)acrylate, neopentyl glycol di(meth) acrylate as an oligomer or a prepolymer of a polyester resin, a polyether resin, an acrylic resin, an epoxy resin, a urethane resin, an alkyd resin, a spiroacetal resin, a polybutadiene resin, a polythiol polyene resin, a (meth)acrylate of a polyfunctional compound such as a polyalcohol and a reactivity diluent having a relatively low molecular weight can be used.

In order to make the above-described ionizing radiation-curable resin composition an ultraviolet light curable resin composition, acetophenones, benzophenons, Michler's benzoyl benzoates, α-amidoxime esters, tetramethyl thiuram monosulfides, and thioxanthones as photopolymerization initiators, and n-butyl amine, triethylamine, and poly-n-butylphosphine as photosensitizers may be added thereto to be used. In particular, in the present invention, a urethane acrylate as an oligomer and a dipentaerythritol hexa(meth) acrylate or the like as a monomer are preferably mixed.

An ionizing radiation-curable resin composition can be cured by irradiation of an electron beam or an ultraviolet light using a normal curing method as a curing method. For example, in the case of electron beam curing, an electron beam having an energy of 50 to 1000 KeV, and preferably 100 to 300 KeV released from a variety of electron beam accelerators such as Cockcroft-Walton-type, Van de Graaff-type, resonance transformer-type, insulating core transformer-type, linear-type, Dynamitron-type, and high-frequency-type is used, and in the case of ultraviolet light curing, a ultraviolet light or the like emitted from a light beam such as an ultra-high pressure mercury lamp, a high pressure mercury lamp, a low pressure mercury lamp, a carbon arc, a xenon arc, and a metal halide lamp can be used.

A protection layer can be formed by apply a coating of the above-described ionizing radiation (ultraviolet light)-curable resin composition on the surface of the above-described light diffusion layer by a method such as spin coating, die coating, dip coating, bar coating, flow coating, roll coating, or gravure coating, and by curing the coating by the above-described means. To the surface of the protection layer, a microstructure such as a concavoconvex structure, a prism structure, or a microlens structure can also be provided depending on the purposes.

(Adhesive Layer)

An adhesive layer is a layer for sticking a film to a transparent screen. The adhesive layer is preferably formed by using an adhesive composition which does not compromise the transmission visibility or the desired optical property of a transparent screen. Examples of the adhesive composition include a natural rubber, a synthetic rubber, an acryl resin, a polyvinyl ether resin, a urethane resin, and a silicone resin. Specific examples of the synthetic rubber include a styrene-butadiene rubber, an acrylonitrile-butadiene rubber, a polyisobutylene rubber, an isobutylene-isoprene rubber, a styrene-isoprene block copolymer, a styrene-butadiene block copolymer, and a styrene-ethylene-butylene block copolymer. Specific examples of the silicone resin include a dimethyl polysiloxane. These adhesives can be used singly or in combination of two or more kinds thereof. Among these, an acrylic adhesive is preferable.

An acrylic resin adhesive at least includes an alkyl (meth)acrylate monomer and is formed by polymerization. Copolymerization of an alkyl (meth)acrylate monomer having an alkyl group having the number of carbon atoms of 1 to about 18 and a monomer having a carboxyl group is usually employed. A (meth)acrylic acid means an acrylic acid and/or a methacrylic acid. Examples of the alkyl (meth)acrylate monomer include methyl (meth)acrylate, ethyl (meth)acrylate, n-propyl (meth)acrylate, sec-propyl (meth)acrylate, n-butyl (meth)acrylate, sec-butyl (meth) acrylate, tert-butyl (meth)acrylate, isoamyl (meth)acrylate, n-hexyl (meth)acrylate, cyclohexyl (meth)acrylate, n-octyl (meth)acrylate, isooctyl (meth)acrylate, 2-ethylhexyl (meth)

acrylate, undecyl (meth)acrylate, and lauryl (meth)acrylate. The above-described alkyl (meth)acrylate is usually copolymerized at a ratio of 30 to 99.5 parts by mass in the acrylic adhesive.

Examples of the monomer having a carboxyl group forming an acrylic resin adhesive include a monomer containing a carboxyl group such as a (meth)acrylic acid, an itaconic acid, a crotonic acid, a maleic acid, a monobutyl maleate, and β-carboxy ethyl acrylate.

With the acrylic resin adhesive, a monomer having another functional group other than the above may be copolymerized as long as the property of the acrylic resin adhesive is not compromised. Examples of the monomer having another functional group include: a monomer having a functional group such as a monomer containing a hydroxyl group such as 2-hydroxyethyl (meth)acrylate, 2-hydroxy propyl (meth)acrylate, and allyl alcohol; a monomer containing an amide group such as (meth)acrylamide, N-methyl (meth)acrylamide, and N-ethyl (meth)acrylamide; a monomer containing a methylol group and an amide group such as N-methylol (meth)acrylamide and dimethylol (meth)acrylamide; a monomer containing an amino group such as aminomethyl (meth)acrylate, dimethylamino ethyl (meth)acrylate, and vinyl pyridine; a monomer containing an epoxy group such as allyl glycidyl ether, or (meth)acrylate glycidyl ether. Examples of the monomer having another functional group other than the above include fluorine substituted alkyl (meth)acrylate, (meth)acrylonitrile, an aromatic compound containing a vinyl group such as styrene and methyl styrene, vinyl acetate, a halogenated vinyl compound.

For the acrylic resin adhesive, other than the monomer having a functional group as described above, another monomer having an ethylenic double bond can be used. Examples of the monomer having an ethylenic double bond include a diester of an α,β-unsaturated dibasic acid such as dibutyl maleate, dioctyl maleate, or dibutyl fumarate; a vinyl ester such as vinyl acetate, vinyl propionate; vinyl ether; a vinyl aromatic compound such as styrene, α-methyl styrene, and vinyl toluene; and (meth)acrylonitrile. Other than the monomer having a ethylenic double bond as described above, a compound having two or more ethylenic double bonds may be used in combination. Examples of such a compound include divinylbenzene, diallyl maleate, diallyl phthalate, ethylene glycol di(meth)acrylate, trimethylol propane tri(meth)acrylate, and methylene bis(meth)acrylamide.

Further, other than the monomers as described above, a monomer having an alkoxy alkyl chain or the like can be used. Examples of the alkoxyalkyl (meth)acrylate include 2-methoxyethyl (meth)acrylate, methoxyethyl (meth)acrylate, 2-methoxypropyl (meth)acrylate, 3-methoxypropyl (meth)acrylate, 2-methoxybutyl (meth)acrylate, 4-methoxybutyl (meth)acrylate, 2-ethoxyethyl (meth)acrylate, 3-ethoxypropyl (meth)acrylate, and 4-ethoxybutyl (meth)acrylate.

As the adhesive composition, other than the above-described acrylic resin adhesive, a homopolymer of a alkyl (meth)acrylate monomer may also be used. Examples of the (meth)acrylate homopolymer include methyl poly(meth)acrylate, ethyl poly(meth)acrylate, propyl poly(meth)acrylate, butyl poly(meth)acrylate, and octyl poly(meth)acrylate. Examples of a copolymer containing two types of acrylic acid ester units include ethyl (meth)acrylate-methyl (meth)acrylate copolymer, butyl (meth)acrylate-methyl (meth)acrylate copolymer, 2-hydroxyethyl (meth)acrylate-methyl (meth)acrylate copolymer, and methyl (meth)acrylate-2-hydroxy 3-phenyloxypropyl (meth)acrylate copolymer.

Examples of a copolymer of a (meth)acrylic ester and another functional monomer include a methyl (meth)acrylate-styrene copolymer, a methyl (meth)acrylate-ethylene copolymer, and a methyl (meth)acrylate-2-hydroxyethyl (meth)acrylate-styrene copolymer.

For the adhesive, a commercially available one may be used, and examples thereof include SK-Dyne 2094, SK-Dyne 2147, SK-Dyne 1811L, SK-Dyne 1442, SK-Dyne 1435, and SK-Dyne 1415 (manufactured by Soken Chemical & Engineering Co., Ltd.), Oribain EG-655, and Oribain BPS5896 (manufactured by TOYO INK CO., LTD.) or the like (trade name), which can be suitably used.

(Reflection Protection Layer)

A reflection protection layer is a layer for preventing a reflection or a reflection of external light on the outermost surface of a transparent screen. The reflection protection layer may be layered on the front side (the observer side) of a transparent screen or may be layered on both sides thereof. When such a film is used as a transparent screen, the reflection protection layer is particularly preferably layered on the observer side. The reflection protection layer is preferably formed by using a resin which does not compromise the transmission visibility or a desired optical property of a transparent screen. For such a resin, for example, a resin cured by an ultraviolet light/electron beam, i.e., an ionizing radiation-curable resin, those obtained by adding a thermoplastic resin and a solvent to an ionizing radiation-curable resin, and a heat setting resin can be used. Among these, an ionizing radiation-curable resin is particularly preferable. To the surface of the reflection protection layer, a microstructure such as a concavoconvex structure, a prism structure, or a microlens structure can be imparted depending on the purposes.

A method of forming the reflection protection layer is not particularly restricted, and a dry coating method such as pasting of a coating film, or direct deposition or sputtering on a film substrate; and a wet coating treatment method such as gravure coating, microgravure coating, bar coating, slide die coating, slot die coating, and dip coating.

(Functional Layer)

A transparent screen according to the present invention may comprise, other than the layers described above, a variety of conventionally known functional layers. Examples of the functional layer include a light absorbing layer containing a dye, a colorant, or the like, a optical diffusion layer such as a prism sheet, a microlens sheet, a Fresnel lens sheet, and a lenticular lens sheet, and light beam cut layer for an ultraviolet light and an infrared ray.

<Method for Manufacturing Transparent Screen>

A method for manufacturing a transparent screen according to the present invention comprises a forming process of a light diffusion layer. In the forming process of the light diffusion layer, conventionally known methods can be employed for the molding, such as extrusion molding consisting of kneading and film manufacturing process; casting film manufacturing method; coating method such as gravure coating, micro gravure coating, bar coating, slide die coating, slot die coating, dip coating, and spraying; injection molding; calendering molding; blow molding; compression molding; and cell casting method; and in view of the wide range of the film thickness that can be manufactured, extrusion or injection molding method can be suitably used. In the following, each step of the extrusion molding method will be described in details as one example of the method for manufacturing the transparent screen.

(Kneading Process)

A kneading process is a process in which a transparent light scattering layer is formed by using an extruder. As for the extruder, a single or a twin-screw kneading extruder can be used. When a twin-screw kneading extruder is used, the process involves kneading the resin and the microparticles while applying a shear stress of 3 to 1,800 kPa, preferably 6 to 1,400 kPa on average over the whole length of a screw of the twin-screw kneading extruder to obtain a resin composition. When the shear stress is in the above-described range, the microparticles can be sufficiently dispersed in the resin. In particular, when the shear stress is 3 kPa or higher, the dispersion homogeneity of the microparticles can be more improved, and when the the shear stress is 1,800 kPa or lower, degradation of the resin is prevented, thereby preventing contamination of an air bubble. The shear stress can be set in a desired range by regulating a twin-screw kneading extruder. In the the present invention, a resin (master batch) to which microparticles are added in advance and a resin to which microparticles are not added may be mixed together to be kneaded by a twin-screw kneading extruder, thereby obtaining a resin composition. The above descriptions are one example of the kneading process and a resin to which microparticles are added in advance (masterbatch) by a single-screw kneading extruder may be prepared or a commonly known dispersing agent may be added at the time of masterbatch.

In a kneading process, after obtaining a microparticle-attached resin composition obtained by sufficiently uniformly mixing a resin and microparticles by a mixer, the microparticle-attached resin composition and a resin can also be kneaded by using a single- or twin-screw kneading extruder to obtain a microparticle-dispersed resin composition. As the mixer, a container revolution type mixer such as KRT series manufactured by KATO-RIKI MFG. CO., LTD., a revolution blade type mixer such as a ribbon type mixer manufactured by TOKUJU CORPORATION, or the like can be used. By using a resin composition sufficiently mixed by such a mixer, generation of a large microparticle aggregation can be suppressed, and a single-screw extruder can be used. The screw shape of the single-screw kneading extruder and the shear stress are not particularly restricted, and a so-called full flight screw having a conveying element over the full length of the screw or a screw partially including a mixing and kneading element can also be used. In the present invention, a resin (master batch) to which microparticles are added in advance and a resin to which microparticles are not added may be mixed together to be kneaded by a single-screw kneading extruder, thereby obtaining a resin composition. A dispersing agent which is usually used may also be used. The single-screw kneading extruder used in the kneading process comprises a cylinder and one screw therein, and the shape of the screw is not particularly restricted.

To the resin composition, other than the resin and the microparticles, conventionally known additives may be added as long as the transmission visibility or a desired optical performance of a transparent screen is not compromised. Examples of the additives include an antioxidant, a lubricant, an ultraviolet absorber, and a stabilizer. The resin and the microparticles are as described above.

A twin-screw kneading extruder used in the kneading process comprises a cylinder and two screws therein and is configured by combining screw elements. For the screw, a flight screw at least including a conveying element and a mixing and kneading element is suitably used. The mixing and kneading element preferably includes at least one selected from the group consisting of a kneading element, a mixing element, and a rotary element. By using such a flight screw including a mixing and kneading element, the microparticles can be sufficiently dispersed in a resin while applying a desired shear stress.

(Film Manufacturing Process)

A film manufacturing process is a process in which a film is made of a resin composition obtained in the kneading process. A film manufacturing method is not particularly restricted, and a film made of a resin composition can be made by a conventionally known method.

For example, a resin composition obtained in the kneading process is provided to a melt extruder heated to a temperature (Tm to Tm+70° C.) of the melting point of the resin composition or higher to melt the resin composition. For the melt extruder, a single-screw kneading extruder, a twin-screw kneading extruder, a vent extruder, or a tandem extruder can be used depending on the purposes.

Subsequently, the molten resin composition is, for example, extruded into a sheet shape by a die such as a T-die, and the extruded sheet is quenched and solidified by a revolving cooling drum or the like, thereby forming a flim. When a film manufacturing process is performed in continuation with the above-described kneading process, a resin composition obtained in the kneading process in a molten state can be directly extruded into a sheet shape by a die to form a film.

The film obtained in the film manufacturing process can be further uniaxially stretched or biaxially stretched by a conventionally known method. By stretching the film, the strength of the film can be improved.

(Layering Process)

A layering process is a process in which a backing layer, a protection layer, an adhesive layer, and the like are further layered on the resin film (the light diffusion layer) obtained in the film manufacturing process. The layering method for each layer is not particularly restricted, and a conventionally known method can be used. When each layer is layered by dry lamination, an adhesive or the like may be used as long as the transmission visibility or a desired optical property of the transparent screen is not compromised.

<Member for Vehicle>

A member for a vehicle according to the present invention comprises a transparent screen as described above. Examples of the member for a vehicle include a windshield or a side glass. When the member for a vehicle comprises a transparent screen described above, a clear image can be displayed on a member for a vehicle without providing a separate screen.

<Member for Building>

A member for a building according to the present invention comprises a transparent screen described above. Examples of the member for a building include a window glass for a house, a glass wall for a convenient store or a shop along the street. When the member for a building comprises a transparent screen described above, a clear image can be displayed on a member for a building without providing a separate screen.

<Video Image Projection System>

A video image projection system according to the present invention comprises a transparent screen described above and a projection device which projects an image from the angle of ±10° or higher, preferably from ±15 to 70°, with respect to the normal direction of the screen surface of the transparent screen. The projection device is not particularly restricted as long as the device can project a video image on a screen, and for example, a commercially available rear projector or a front projector can be used.

Figure 3:
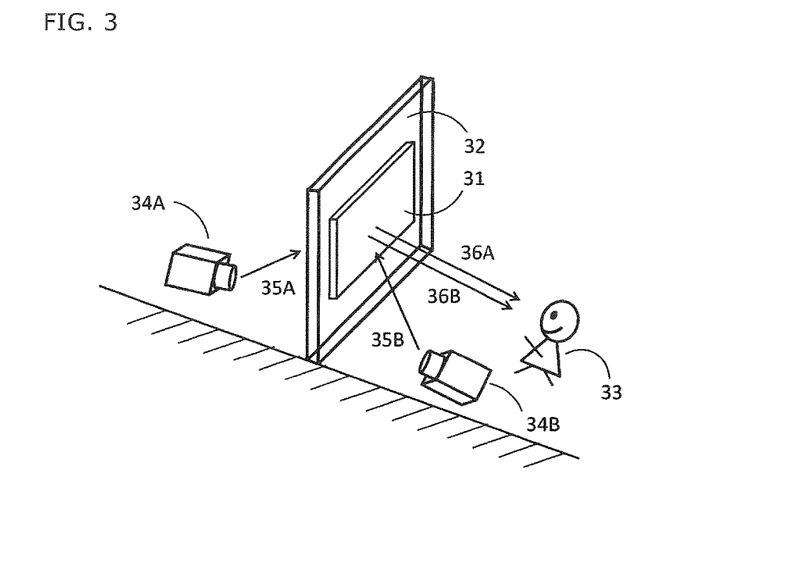
FIG. 3 is a schematic diagram illustrating one embodiment of a video image projection system according to the present invention.

FIG. 3 is a schematic diagram illustrating one embodiment of a transparent screen and a video image projection system according to the present invention. A transparent screen 31 is arranged on the observer 33 side of the transparent partition 32. Since the transparent screen 31 is stuck to the transparent partition 32, the film preferably includes an adhesive layer. When the transparent screen 31 is a rear projection screen, the video image projection device comprises the transparent screen 31 and a projection device 34A provided on the opposite side (rear side) of the observer 33 with respect to the transparent screen 31 and at a location of from 15 to 70° at the lower side with respect to the normal line direction of the transparent screen. Projection light 35A emitted from the projection device 34A enters from the rear side of the transparent screen 31 and anisotropically diffuses by the transparent screen 31, whereby the observer 33 can visually recognize diffusion light 36A. On the other hand, when the transparent screen 31 is a front projection screen, the video image projection system comprises the transparent screen 31 and a projection device 34B provided on the side (front side) of the observer 33 with respect to the transparent screen 31 and at a location of from 15 to 70° at the lower side with respect to the normal line direction of the transparent screen. Projection light 35B emitted from the projection device 34B enters from the front side of the transparent screen 31 and anisotropically diffuses by the transparent screen 31, whereby the observer 33 can visually recognize diffusion light 36B.

EXAMPLES

In the following, the present invention will be more specifically described with reference to Examples and Comparative Examples, but the present invention should not be construed to be limited to the following Examples.

The measuring methods of various physicalities and performance evaluation in the Examples and the Comparative Examples are as follows.

(1) Haze

Haze was measured by using a turbidimeter (Part No.: NDH-5000; manufactured by NIPPON DENSHOKU INDUSTRIES CO., LTD.) in accordance with JIS K 7136.

(2) Total Light Transmittance

Total light transmittance was measured by using a turbidimeter (Part No.: NDH-5000; manufactured by NIPPON DENSHOKU INDUSTRIES CO., LTD.) in accordance with JIS K 7361-1.

(3) Scattered Light Brilliance Profile

Figure 4:
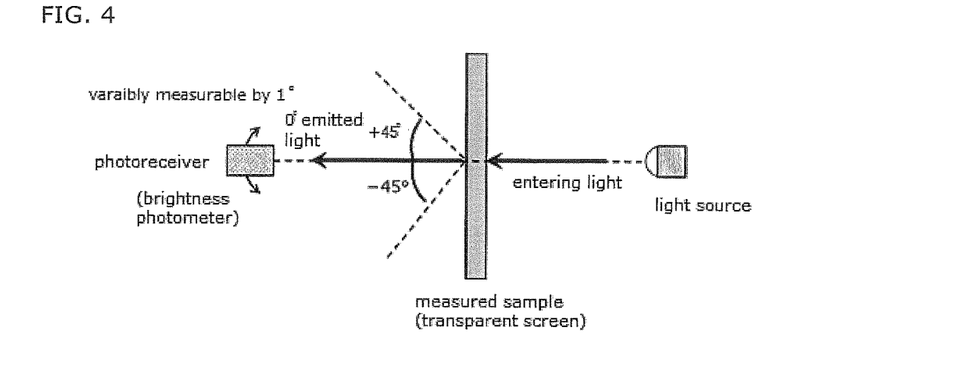
FIG. 4 is a schematic view of the measurement condition of the scattered light brilliance profile.

Y value in the XYZ color system is regarded as the brilliance and the emitted light brilliance in 0 degree measured with no sample by using a goniophotometer (product no: GSP-2; manufactured by Murakami Color Research Laboratory) was regarded as the entered light brilliance. Next, a transparent screen manufactured as a sample below was set, the emitted light brilliance was measured with changing the the measurement angle from −80 degrees to +80 degrees, and the relative brilliance between the entered light brilliance was calculated. The schematic view of the measurement method of the scattered light brilliance profile is shown in FIG. 4.

(4) Image Clarity

Image clarity is a value of definition (%) when measured by using an image clarity measuring device (Part No.: ICM-IT; manufactured by Suga Test Instruments Co., Ltd.), with an optical comb having a width of 0.125 mm in accordance with JIS K7374. The larger the value of the definition, the higher is the transmission image clarity.

(5) Video Image Clearness

An image was projected by using an ultra-short focus projector (manufactured by SEIKO EPSON CORPORATION, EB-535W) from a position 50 cm away at an angle of 50° at the lower side with respect to the normal direction of the transparent screen. Then, after adjusting a focus knob of the projector to bring focus on the screen surface, the image displayed on the screen was visually evaluated from 2 places: 1 m frontward from the screen; and 1 m backward from the screen, under the following evaluation criteria.

[Evaluation Criteria]
⊚: A significantly clear video image was visualized
○: A clear video image was visualized
Δ: A video image was visualized with slightly fuzzy outline and color phase
X: A video image was visualized with fuzzy outline, the screen was unsuitable for use <Manufacturing of Transparent Screen>

Example 1

A polyethylene terephthalate pellet (manufactured by Bell Polyester Products, Inc., brand name: IFG8L, refractive index: 1.68) and 0.6% by mass of zirconium oxide ($ZrO_2$) powder (median diameter of the primary particles: 11 nm, refractive index: 2.40) based on the PET pellet were mixed for 30 minutes in a tumbler mixer to obtain a PET pellet which $ZrO_2$ powder was attached to its surface homogeneously. The obtained pellet was supplied to a hopper of a twin-screw kneading machine with a strand die and extruded at 250° C. to obtain a masterbatch in which the $ZrO_2$ particles are kneaded in. The obtained masterbatch and the PET pellet (brand name: IFG8L) were mixed homogeneously in a proportion of 1:3, introduced into a hopper of a single-screw kneading machine with a T die, and extruded at 250° C. to produce a film in a thickness of 75 μm. The $ZrO_2$ particles concentration in the film was 0.15% by mass. The film (the light diffusion layer) thickness t (μm) and the concentration c (% by mass) of the $ZrO_2$ particles based on the PET pellet (the binder) satisfied the following formula: t×c=11.25. The obtained film (the light diffusion layer) was interposed between a pair of transparent glass plates in the thickness of 2 mm to obtain a transparent screen.

Figure 5:
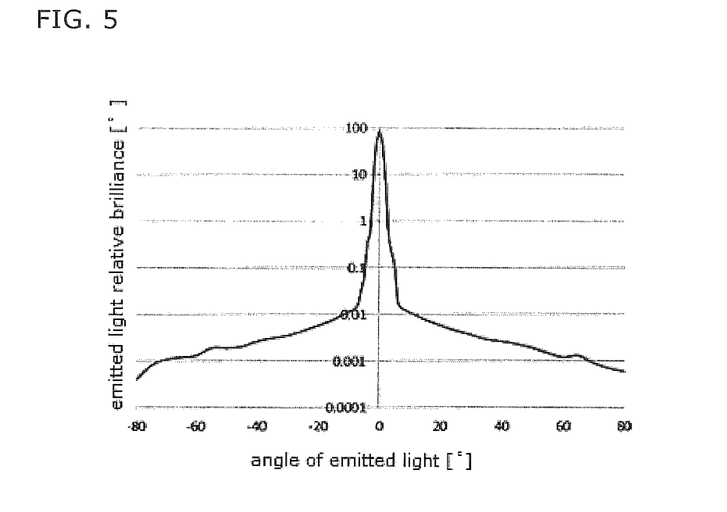
FIG. 5 is a figure showing the scattered light brilliance profile of Example 1.

When the scattered light brilliance profile of the obtained screen was measured with the goniophotometer, the emitted light relative brilliance in the 0° direction was 80.9, when the entered light brilliance was 100 (condition A); the emitted light relative brilliance in the ±5° direction was 0.11, when the emitted light relative brilliance in the 0° direction was 100 (condition B); and the emitted light relative brilliance in the ±50° direction was 0.0029, when the emitted light relative brilliance in the 0° direction was 100 (condition C). These scattered light brilliance profiles are shown in FIG. 5.

The obtained screen had a total light transmittance of 89%, the haze of 6.5%, and had sufficient transparency. In addition, the image clarity was 93%, and the image seen transmitted through the screen was clear. Further, the image was sufficiently formed on the screen, and a clear video image was visible when observed both from the front side and the rear side. Especially, an extremely clear image was visible when observed from the rear side. Accordingly, an image of a clear background and a clear projected image were visible simultaneously.

Example 2

A polycarbonate (PC) pellet (manufactured by Sumika Styron Polycarbonate Limited, brand name: SD2201W, refractive index: 1.59) and 0.01% by mass of zirconium oxide ($ZrO_2$) powder (median diameter of the primary particles: 11 nm, refractive index: 2.40) based on the PC pellet were mixed for 30 minutes in a tumbler mixer to obtain a PC pellet which $ZrO_2$ powder was attached to its surface homogeneously. The obtained pellet was supplied to a hopper of a twin-screw kneading machine with a strand die and extruded at 270° C. to obtain a PC pellet in which the $ZrO_2$ particles are kneaded in. The obtained PC pellet (brand name: IFG8L) was used to produce a board-form molded article in a thickness of 3 mm (3000 μm) with an injection molding machine (Trade Name: FNX-III; manufactured by Nissei Plastic Industrial Co., Ltd.). The $ZrO_2$ particles concentration in the board-like molded article was 0.01% by mass. The board-like molded article (the light diffusion layer) thickness t (μm) and the concentration c (% by mass) of the $ZrO_2$ particles based on the PC pellet (the binder) satisfied the following formula: t×c=30. This board-like molded article (the light diffusion layer) was directly used as a screen.

When the scattered light brilliance profile of the obtained screen was measured with the goniophotometer, the emitted light relative brilliance in the 0° direction was 78.1, when the entered light brilliance was 100 (condition A); the emitted light relative brilliance in the ±5° direction was 0.41, when the emitted light relative brilliance in the 0° direction was 100 (condition B); and the emitted light relative brilliance in the ±50° direction was 0.0031, when the emitted light relative brilliance in the 0° direction was 100 (condition C).

The obtained screen had a total light transmittance of 89%, the haze of 7.7%, and had sufficient transparency. In addition, the image clarity was 73%, and the image seen transmitted through the screen was clear. Further, the image was sufficiently formed on the screen, and a clear video image was visible when observed both from the front side and the rear side. Especially, an extremely clear image was visible when observed from the rear side. Accordingly, an image of a clear background and a clear projected image were visible simultaneously.

Example 3

A PMMA pellet (manufactured by Mitsubishi Rayon Co., Ltd., trade name: ACRYPET VH, refractive index: 1.49) and 2.0% by mass of zirconium oxide ($ZrO_2$) powder (median diameter of the primary particles: 11 nm, refractive index: 2.40) based on the PMMA pellet were mixed for 30 minutes in a tumbler mixer to obtain a PMMA pellet which $ZrO_2$ powder was attached to its surface homogeneously. The obtained PMMA pellet was supplied to a hopper of a twin-screw kneading machine with a strand die and extruded at 250° C. to obtain a PMMA pellet in which the $ZrO_2$ particles are kneaded in. The obtained PMMA pellet was dissolved in a toluene solution to obtain a polymer solution having a polymer concentration of 10% by mass. The obtained polymer solution was coated onto a transparent glass plate (3 mm thick) by using a doctor blade (manufactured by Eager Corporation). The polymer solution-coated glass plate was dried for 2 days at 60° C. on a hot plate to produce a transparent screen comprising a light diffusion layer (thickness 3 μm) in which the $ZrO_2$ microparticles are dispersed in the PMMA resin. The $ZrO_2$ particles concentration in the light diffusion layer was 2.0% by mass. The light diffusion layer thickness t (μm) and the concentration c (% by mass) of the $ZrO_2$ particles based on the PMMA (the binder) satisfied the following formula: t×c=6.

When the scattered light brilliance profile of the obtained screen was measured with the goniophotometer, the emitted light relative brilliance in the 0° direction was 84.1, when the entered light brilliance was 100 (condition A); the emitted light relative brilliance in the ±5° direction was 0.088, when the emitted light relative brilliance in the 0° direction was 100 (condition B); and the emitted light relative brilliance in the ±50° direction was 0.0023, when the emitted light relative brilliance in the 0° direction was 100 (condition C).

The obtained screen had a total light transmittance of 91%, the haze of 4.5%, and had sufficient transparency. In addition, the image clarity was 94%, and the image seen transmitted through the screen was clear. Further, the image was sufficiently formed on the screen, and a clear video image was visible when observed both from the front side and the rear side. Accordingly, an image of a clear background and a clear projected image were visible simultaneously.

Example 4

A PET pellet (manufactured by Bell Polyester Products, Inc., brand name: IFG8L, refractive index: 1.68) and 0.01% by mass of bright flake-form aluminum microparticles (average diameter of the primary particles: 3 μm, aspect ratio: 300, regular reflectance: 62.8%) based on the PET pellet were mixed for 30 minutes in a tumbler mixer to obtain a PET pellet which flake-form aluminum microparticles were attached to its surface homogeneously. The obtained PET pellet was supplied to a hopper of a twin-screw kneading machine with a strand die and extruded at 250° C. to obtain a masterbatch in which the flake-form aluminum is kneaded in. The obtained masterbatch and the PET pellet (brand name: IFG8L) were mixed homogeneously in a proportion of 1:1, introduced into a hopper of a single-screw kneading machine with a T die, and extruded at 250° C. to produce a film in a thickness of 75 μm. The flake-form aluminum microparticles concentration in the film was 0.005% by mass. The film (the light diffusion layer) thickness t (μm) and the concentration c (% by mass) of the flake-form aluminum based on the PET pellet (the binder) satisfied the following formula: t×c=0.375. The obtained film (the light diffusion layer) was interposed between a pair of transparent glass plates in the thickness of 2 mm to obtain a transparent screen.

When the scattered light brilliance profile of the obtained screen was measured with the goniophotometer, the emitted light relative brilliance in the 0° direction was 81.9, when the entered light brilliance was 100 (condition A); the emitted light relative brilliance in the ±5° direction was 0.083, when the emitted light relative brilliance in the 0° direction was 100 (condition B); and the emitted light relative brilliance in the ±50° direction was 0.0012, when the emitted light relative brilliance in the 0° direction was 100 (condition C).

The obtained screen had a total light transmittance of 86%, the haze of 4.5%, and had sufficient transparency. In addition, the image clarity was 95%, and the image seen transmitted through the screen was clear. Further, the image was sufficiently formed on the screen, and an extremely clear video image was visible when observed both from the front side and the rear side. Accordingly, an image of a clear background and a clear projected image were visible simultaneously.

Example 5

A 75 μm thick film was produced in the similar manner as Example 4, except that the added amount of flake-form aluminum based on PET was changed to 0.002% by mass. The flake-form aluminum microparticles concentration in the film was 0.001% by mass. The film (the light diffusion layer) thickness t (μm) and the concentration c (% by mass) of the flake-form aluminum based on the PET pellet (the binder) satisfied the following formula: t×c=0.075. The obtained film (the light diffusion layer) was interposed between a pair of transparent glass plates in the thickness of 2 mm to obtain a transparent screen.

When the scattered light brilliance profile of the obtained screen was measured with the goniophotometer, the emitted light relative brilliance in the 0° direction was 82.5, when the entered relative brilliance was 100 (condition A); the emitted light relative brilliance in the ±5° direction was 0.075, when the emitted light relative brilliance in the 0° direction was 100 (condition B); and the emitted light relative brilliance in the ±50° direction was 0.0008, when the emitted light relative brilliance in the 0° direction was 100 (condition C).

The obtained screen had a total light transmittance of 88%, the haze of 2.5%, and had sufficient transparency. In addition, the image clarity was 95%, and the image seen transmitted through the screen was clear. Further, the image was sufficiently formed on the screen, and an extremely clear video image was visible when observed both from the front side and the rear side. Accordingly, an image of a clear background and a clear projected image were visible simultaneously.

Example 6

The masterbatch, kneaded therein the $ZrO_2$ particles, as obtained in Example 1 was introduced directly into a hopper of a single-screw kneading machine with a T die, and extruded at 250° C. to produce a film in a thickness of 75 μm. The $ZrO_2$ particles concentration in the film was 0.6% by mass. The film (the light diffusion layer) thickness t (μm) and the concentration c (% by mass) of the $ZrO_2$ particles based on the PET pellet (the binder) satisfied the following formula: t×c=45. The obtained film (the light diffusion layer) was interposed between a pair of transparent glass plates in the thickness of 2 mm to obtain a transparent screen.

When the scattered light brilliance profile of the obtained screen was measured with the goniophotometer, the emitted light relative brilliance in the 0° direction was 51.9, when the entered light brilliance was 100 (condition A); the emitted light relative brilliance in the ±5° direction was 1.0, when the emitted light relative brilliance in the 0° direction was 100 (condition B); and the emitted light relative brilliance in the ±50° direction was 0.045, when the emitted light relative brilliance in the 0° direction was 100 (condition C).

The obtained screen had a total light transmittance of 89%, the haze of 17.3%, and had sufficient transparency. In addition, the image clarity was 88%, and the image seen transmitted through the screen was clear. Further, the image was sufficiently formed on the screen, and a clear video image was visible when observed both from the front side and the rear side. Especially, an extremely clear image was visible when observed from the rear side. Accordingly, an image of a clear background and a clear projected image were visible simultaneously.

Example 7

A commercially available urethane acrylate type UV curable resin (manufactured by DIC Company, UNIDIC V-4018, containing butyl acetate and isopropyl alcohol as solvates) was used as a binder and 0.015% by mass of silver microparticles (average diameter of the primary particles: 1 μm, aspect ratio: 200, regular reflectance: 32.8%) based on the weight of nonvolatile portion were added as bright flake-form microparticles to prepare dispersion liquid A. Further, based on 100 parts by weight of this dispersion liquid A was added 5 parts by weight of photopolymerization initiator (manufactured by BASF Japan Co., Ltd., IRGACURE 184) to obtain photocurable dispersion liquid B. The obtained dispersion liquid B was coated on to a 100 μm thick biaxially-stretched polyester (PET) film (manufactured by Toyobo Co., Ltd., COSMOSHINE A4100) using a bar coater such that the film thickness after dryness will be 25 μm, dried for 5 minutes in a hot air drying machine at 70° C., and then irradiated by ultra violet rays to produce a light diffusion layer. The light diffusion layer thickness t (μm) and the concentration c (% by mass) of the silver particles (the binder) based on the urethane acrylate type UV curable resin satisfied the following formula: t×c=0.375. Subsequently, a transparent glass plate in the thickness of 2 mm was layered on the light diffusion layer to obtain a transparent screen.

When the scattered light brilliance profile of the obtained screen was measured with the goniophotometer, the emitted light relative brilliance in the 0° direction was 80.1, when the entered light brilliance was 100 (condition A); the emitted light relative brilliance in the ±5° direction was 0.080, when the emitted light relative brilliance in the 0° direction was 100 (condition B); and the emitted light relative brilliance in the ±50° direction was 0.0010, when the emitted light relative brilliance in the 0° direction was 100 (condition C).

The obtained screen had a total light transmittance of 88%, the haze of 4.6%, and had sufficient transparency. In addition, the image clarity was 77%, and the image seen transmitted through the screen was clear. Further, the image was sufficiently formed on the screen, and a clear video image was visible when observed both from the front side and the rear side. Especially, an extremely clear image was visible when observed from the rear side. Accordingly, an image of a clear background and a clear projected image were visible simultaneously.

Comparative Example 1

A PET pellet (manufactured by Bell Polyester Products, Inc., brand name: IFG8L, refractive index: 1.68) and 2.0% by mass of crosslinkable acrylic resin microparticles (average diameter of the primary particles: 3 μm, refractive index: 1.49, manufactured by Sekisui Plastics Co., Ltd., TECH-POLYMER SSX-103) based on the PET pellet were mixed for 30 minutes in a tumbler mixer to obtain a PET pellet which crosslinkable acrylic resin microparticles were attached to its surface homogeneously. The obtained pellet was supplied to a hopper of a twin-screw kneading machine with a strand die and extruded at 250° C. to obtain a masterbatch which the crosslinkable acrylic microparticles are kneaded in. The obtained masterbatch and the PET pellet (brand name: IFG8L) were mixed homogeneously in a proportion of 1:1, introduced into a hopper of a single-screw kneading machine with a T die, and extruded at 250° C. to produce a film in a thickness of 75 μm. The crosslinkable acrylic microparticles concentration in the film was 1.0% by mass. The film (the light diffusion layer) thickness t (μm) and the concentration c (% by mass) of the crosslinkable acrylic resin microparticles based on the PET pellet (the binder) satisfied the following formula: t×c=75. The obtained film (the light diffusion layer) was interposed between a pair of transparent glass plates in the thickness of 2 mm to obtain a transparent screen.

Figure 6:
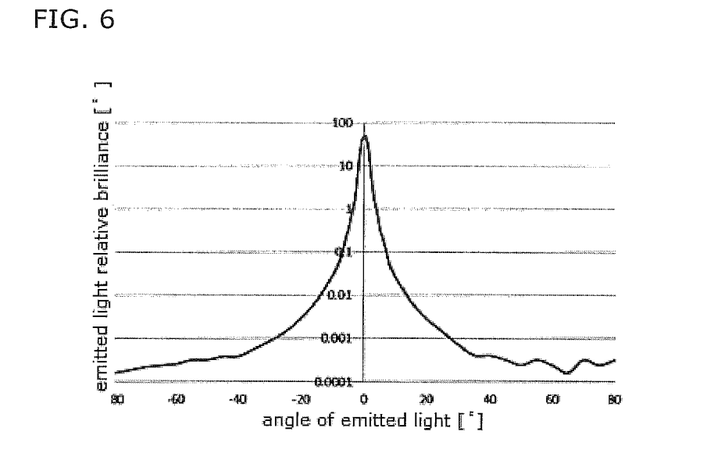
FIG. 6 is a figure showing the scattered light brilliance profile of Comparative Example 1.

When the scattered light brilliance profile of the obtained screen was measured with the goniophotometer, the emitted light relative brilliance in the 0° direction was 51.8, when the entered light brilliance was 100 (condition A); the emitted light relative brilliance in the ±5° direction was 1.2, when the emitted light relative brilliance in the 0° direction was 100 (condition B); and the emitted light relative brilliance in the ±50° direction was 0.00049, when the emitted light relative brilliance in the 0° direction was 100 (condition C). These scattered light brilliance profiles are shown in FIG. 6.

The obtained screen had a total light transmittance of 88% and the haze of 14.3%. In addition, the image clarity was 38%, and the image seen transmitted through the screen was unclear. Further, since the emitted light relative brilliance in the ±5° direction was over 1.1 when the emitted light relative brilliance in the 0° direction was 100 (condition B), there was turbidity in the screen. Since the emitted light relative brilliance in the ±50° direction was less than 0.0005 when the emitted light relative brilliance in the 0° direction was 100 (condition C), the image did not form sufficiently on the screen, and a clear video image was not visible when observed both from the front side and the rear side.

Comparative Example 2

A PET pellet (manufactured by Bell Polyester Products, Inc., brand name: IFG8L, refractive index: 1.68) and 2.0% by mass of silica microparticles (average diameter of the primary particles: 2.6 μm, refractive index: 1.45) based on the PET pellet were mixed for 30 minutes in a tumbler mixer to obtain a PET pellet which silica microparticles were attached to its surface homogeneously. The obtained pellet was supplied to a hopper of a twin-screw kneading machine with a strand die and extruded at 250° C. to obtain a masterbatch which the silica microparticles are kneaded in. The obtained masterbatch and the PET pellet (brand name: IFG8L) were mixed homogeneously in a proportion of 1:1, introduced into a hopper of a single-screw kneading machine with a T die, and extruded at 250° C. to produce a film in a thickness of 75 μm. The silica microparticles concentration in the film was 1.0% by mass. The film (the light diffusion layer) thickness t (μm) and the concentration c (% by mass) of the silica microparticles based on the PET pellet (the binder) satisfied the following formula: t×c=75. The obtained film (the light diffusion layer) was interposed between a pair of transparent glass plates in the thickness of 2 mm to obtain a transparent screen.

When the scattered light brilliance profile of the obtained screen was measured with the goniophotometer, the emitted light relative brilliance in the 0° direction was 68.5, when the entered light brilliance was 100 (condition A); the emitted light relative brilliance in the ±5° direction was 0.73, when the emitted light relative brilliance in the 0° direction was 100 (condition B); and the emitted light relative brilliance in the ±50° direction was 0.00045, when the emitted light relative brilliance in the 0° direction was 100 (condition C).

The obtained screen had a total light transmittance of 88% and the haze of 10.1%. In addition, the image clarity was 32%, and the image seen transmitted through the screen was unclear. Further, since the emitted light relative brilliance in the ±50° direction was less than 0.0005 when the emitted light relative brilliance in the 0° direction was 100 (condition C), the image did not form sufficiently on the screen, and a clear video image was not visible when observed both from the front side and the rear side.

Comparative Example 3

A 75 μm thick film was produced in the similar manner as Example 4, except that the added amount of silica microparticles based on PET was changed to 4.0% by mass. The silica microparticles concentration in the film was 2.0% by mass. The film (the light diffusion layer) thickness t (μm) and the concentration c (% by mass) of the silica microparticles based on the PET pellet (the binder) satisfied the following formula: t×c=150. The obtained film (the light diffusion layer) was interposed between a pair of transparent glass plates in the thickness of 2 mm to obtain a transparent screen.

When the scattered light brilliance profile of the obtained screen was measured with the goniophotometer, the emitted light relative brilliance in the 0° direction was 38.5, when the entered light brilliance was 100 (condition A); the emitted light relative brilliance in the ±5° direction was 1.3, when the emitted light relative brilliance in the 0° direction was 100 (condition B); and the emitted light relative brilliance in the ±50° direction was 0.00049, when the emitted light relative brilliance in the 0° direction was 100 (condition C).

The obtained screen had a total light transmittance of 88% and the haze of 17.1° h. In addition, the image clarity was 28%, and the image seen transmitted through the screen was unclear. Further, since the emitted light relative brilliance in the 0° direction was less than 50 when the entered light brilliance was 100 (condition A) and since the emitted light relative brilliance in the ±5° direction was over 1.1 when the emitted light relative brilliance in the 0° direction was 100 (condition B), there was turbidity in the screen. Since the emitted light relative brilliance in the ±50° direction was less than 0.0005 when the emitted light relative brilliance in the 0° direction was 100 (condition C), the image did not form sufficiently on the screen, and a clear video image was not visible when observed both from the front side and the rear side.

Comparative Example 4

A masterbatch was obtained in the similar manner as Example 1, except that the added amount of $ZrO_2$ particles based on PET was changed to 1.5% by mass. The obtained masterbatch was introduced directly into a hopper of a single-screw kneading machine with a T die, and extruded at 250° C. to produce a film in a thickness of 75 μm. The $ZrO_2$ particles concentration in the film was 1.5% by mass. The film (the light diffusion layer) thickness t (μm) and the concentration c (% by mass) of the $ZrO_2$ particles based on the PET pellet (the binder) satisfied the following formula: t×c=112.5. The obtained film (the light diffusion layer) was interposed between a pair of transparent glass plates in the thickness of 2 mm to obtain a transparent screen.

When the scattered light brilliance profile of the obtained screen was measured with the goniophotometer, the emitted light relative brilliance in the 0° direction was 27.9, when the entered light brilliance was 100 (condition A); the emitted light relative brilliance in the ±5° direction was 1.55, when the emitted light relative brilliance in the 0° direction was 100 (condition B); and the emitted light relative brilliance in the ±50° direction was 0.055, when the emitted light relative brilliance in the 0° direction was 100 (condition C).

The obtained screen had a total light transmittance of 89% and the haze of 55.5%. In addition, the image clarity was 77%, and the image seen transmitted through the screen was clear. Further, since the emitted light relative brilliance in the 0° direction was less than 50 when the entered light brilliance was 100 (condition A) and since the emitted light relative brilliance in the ±5° direction was over 1.1 when the emitted light relative brilliance in the 0° direction was 100

(condition B), there was turbidity in the screen and a clear video image was not visible when observed both from the front side and the rear side.

Comparative Example 5

A film was produced in the similar manner as Example 5, except that the film thickness was changed to 45 μm. The film (the light diffusion layer) thickness t (μm) and the concentration c (% by mass) of the bright flake-form aluminum based on the PET pellet (the binder) satisfied the following formula: t×c=0.045. The obtained film (the light diffusion layer) was interposed between a pair of transparent glass plates in the thickness of 2 mm to obtain a transparent screen.

When the scattered light brilliance profile of the obtained screen was measured with the goniophotometer, the emitted light relative brilliance in the 0° direction was 83.5, when the entered light brilliance was 100 (condition A); the emitted light relative brilliance in the ±5° direction was 0.062, when the emitted light relative brilliance in the 0° direction was 100 (condition B); and the emitted light relative brilliance in the ±50° direction was 0.00032, when the emitted light relative brilliance in the 0° direction was 100 (condition C).

The obtained screen had a total light transmittance of 88% and the haze of 1.5% and also the image clarity of 95%. In addition, upon visually evaluating the image clarity, a clear video image was able to be visualized. Accordingly, an image of a clear background and a clear projected image were visible simultaneously.

Further, since the emitted light relative brilliance in the ±50° direction was less than 0.0005 when the emitted light relative brilliance in the 0° direction was 100 (condition C), the image did not form sufficiently on the screen, and a clear video image was not visible when observed both from the front side and the rear side.

Comparative Example 6

A film was produced in the similar manner as Example 1, except that the film thickness was changed to 55 μm. The film (the light diffusion layer) thickness t (μm) and the concentration c (% by mass) of the crosslinkable acrylic resin microparticles based on the PET pellet (the binder) satisfied the following formula: t×c=55. The obtained film (the light diffusion layer) was interposed between a pair of transparent glass plates in the thickness of 2 mm to obtain a transparent screen.

When the scattered light brilliance profile of the obtained screen was measured with the goniophotometer, the emitted light relative brilliance in the 0° direction was 49.0, when the entered light brilliance was 100 (condition A); the emitted light relative brilliance in the ±5° direction was 1.1, when the emitted light relative brilliance in the 0° direction was 100 (condition B); and the emitted light relative brilliance in the ±50° direction was 0.00049, when the emitted light relative brilliance in the 0° direction was 100 (condition C).

The obtained screen had a total light transmittance of 88% and the haze of 11.2%. In addition, the image clarity was 44%, and the image seen transmitted through the screen was unclear. Further, since the emitted light relative brilliance in the 0° direction was less than 50 when the entered light brilliance was 100 (condition A), there was turbidity in the screen. Since the emitted light relative brilliance in the ±50° direction was less than 0.0005 when the emitted light relative brilliance in the 0° direction was 100 (condition C), the image did not form sufficiently on the screen, and a clear video image was not visible when observed both from the front side and the rear side.

Details and the results of evaluation of the light diffusion layers and screens produced in Examples and Comparative Examples are listed on Table 3.

TABLE 3

| | Light Diffusion Layer | | | Conditions of Scattered light Brilliance Profile | | | Transparent Screen | | | Video Image Clarity | |
| | Type of Microparticles | Type of Resin | t × c | A | B | C | Total Light Transmittance [%] | Haze [%] | Image Clarity [%] | Observation from front side | Observation from rear side |
|---|---|---|---|---|---|---|---|---|---|---|---|
| Example 1 | $ZrO_2$ | PET | 11.25 | 80.9 | 0.11 | 0.0029 | 89 | 6.5 | 93 | ◯ | ◉ |
| Example 2 | $ZrO_2$ | PC | 30 | 78.1 | 0.41 | 0.0031 | 89 | 7.7 | 73 | ◯ | ◉ |
| Example 3 | $ZrO_2$ | PMMA | 6 | 84.1 | 0.088 | 0.0023 | 91 | 4.5 | 94 | ◯ | ◯ |
| Example 4 | Al | PET | 0.375 | 81.9 | 0.083 | 0.0012 | 86 | 4.5 | 95 | ◉ | ◉ |
| Example 5 | Al | PET | 0.075 | 82.5 | 0.075 | 0.0008 | 88 | 2.5 | 95 | ◉ | ◉ |
| Example 6 | $ZrO_2$ | PET | 45 | 51.9 | 1.0 | 0.045 | 89 | 17.3 | 88 | ◯ | ◉ |
| Example 7 | Ag | Urethane Acrylate | 0.375 | 80.1 | 0.080 | 0.0010 | 88 | 4.6 | 77 | ◯ | ◉ |
| Comparative Example 1 | Acrylic Resin | PET | 75 | 51.8 | 1.2 | 0.00049 | 88 | 14.3 | 38 | X | X |
| Comparative Example 2 | Silica | PET | 75 | 68.5 | 0.73 | 0.00045 | 88 | 10.1 | 32 | X | X |
| Comparative Example 3 | Silica | PET | 150 | 38.5 | 1.3 | 0.00049 | 88 | 17.1 | 28 | X | X |
| Comparative Example 4 | $ZrO_2$ | PET | 112.5 | 27.9 | 1.55 | 0.055 | 89 | 55.5 | 77 | X | X |
| Comparative Example 5 | Al | PET | 0.045 | 83.5 | 0.062 | 0.00032 | 88 | 1.5 | 95 | X | X |
| Comparative Example 6 | Acrylic Resin | PET | 55 | 49.0 | 1.1 | 0.00049 | 88 | 11.2 | 44 | X | X |

DESCRIPTION OF SYMBOLS

10 Transparent screen
11 Light diffusion layer
12 Binder
13 Microparticles
20 Transparent screen
21 Light diffusion layer
22 Protection layer
23 Backing layer
24 Adhesive layer
31 Transparent screen
32 Transparent partition
33 Observer
34A, 34B Projection device
35A, 35B Projection light
36A, 36B Diffusion light

The invention claimed is:

1. A transparent screen comprising:
a light diffusion layer including a binder and microparticles, wherein
the microparticles are light scattering microparticles or light reflecting microparticles,
the light scattering microparticles have a median diameter of from 0.1 to 2500 nm, and the content of the light scattering microparticles in the light diffusion layer is from 0.0001 to 0.6% by mass,
the light reflecting microparticles are bright flake-form microparticles and have an average aspect ratio of from 3 to 800, and the content of the bright flake-form microparticles in the light diffusion layer is from 0.0001 to 5.0% by mass,
said transparent screen having a scattered light brilliance profile characterized to meet the following conditions A to C:
A: the emitted light relative brilliance in the 0° direction is from 50 to 95, when the entered light brilliance is 100;
B: the emitted light relative brilliance in the ±5° direction is 1.1 or less, when the emitted light relative brilliance in the 0° direction is 100; and
C: the emitted light relative brilliance in the ±50° direction is 0.0005 or higher, when the emitted light relative brilliance in the 0° direction is 100;
when the brilliance is Y from the XYZ color system measured with a goniophotometer.

2. The transparent screen according to claim 1, wherein when the thickness of the light diffusion layer is t (μm) and the concentration of the microparticles based on the binder is c (% by mass), t and c satisfy the following formula (I):

$$0.05 \leq (t \times c) \leq 50 \qquad (I).$$

3. The transparent screen according to claim 1, wherein the absolute value of the difference between the refractive index $n_1$ of the binder and the refractive index $n_2$ of the light scattering microparticles is 0.1 or higher.

4. The transparent screen according to claim 1, wherein the light scattering microparticles are at least one selected from the group consisting of zirconium oxide, zinc oxide, titanium oxide, cerium oxide, barium titanate, strontium titanate, a crosslinkable acrylic resin, a styrene resin, and silica.

5. The transparent screen according to claim 1, wherein the light reflecting microparticles have a regular reflectance of from 12 to 100%.

6. The transparent screen according to claim 1, wherein the bright flake-form microparticles are metallic microparticles selected from the group consisting of aluminum, silver, platinum, gold, titanium, nickel, tin, tin-cobalt alloy, indium, chromium, titanium oxide, aluminum oxide, and zinc sulfide, a bright material of a glass coated with metal or metal oxide, or a bright material of natural or synthetic mica coated with metal or metal oxide.

7. The transparent screen according to claim 1, wherein the binder is an organic binder or an inorganic binder.

8. The transparent screen according to claim 7, wherein the organic binder is a thermoplastic resin or a self crosslinkable resin.

9. The transparent screen according to claim 8, wherein the thermoplastic resin is at least one selected from the group consisting of an acrylic resin, a polyester resin, a polyolefin resin, a vinyl resin, a polycarbonate resin, and a polystyrene resin.

10. A member for a vehicle comprising the transparent screen according to claim 1.

11. A member for a building comprising the transparent screen according to claim 1.

12. A video image projection system comprising the transparent screen according to claim 1 and a projection device which projects an image from the degree of ±10° or higher to the normal direction of the screen surface of the transparent screen.

13. The transparent screen according to claim 1, wherein the microparticles are the light scattering microparticles, and the content of the light scattering microparticles in the light diffusion layer is from 0.0001 to 0.5% by mass.

14. The transparent screen according to claim 1, wherein the microparticles are the bright flake-form microparticles, and the content of the light bright flake-form microparticles in the light diffusion layer is from 0.0001 to 0.015% by mass.

* * * * *